(12) United States Patent
DeVorss

(10) Patent No.: US 7,422,163 B1
(45) Date of Patent: Sep. 9, 2008

(54) CEILING PADDLE FAN WITH INTEGRAL WATER MISTER AND ASSOCIATED METHOD

(76) Inventor: Bryan J. DeVorss, 7416 High Point La., Sacramento, CA (US) 95842

( * ) Notice: Subject to any disclaimer, the term of this patent is extended or adjusted under 35 U.S.C. 154(b) by 0 days.

(21) Appl. No.: 11/786,930

(22) Filed: Apr. 13, 2007

Related U.S. Application Data

(60) Provisional application No. 60/791,379, filed on Apr. 13, 2006.

(51) Int. Cl.
B05B 15/06 (2006.01)
B05B 15/00 (2006.01)
B05B 17/00 (2006.01)
B05B 3/00 (2006.01)

(52) U.S. Cl. .................. 239/289; 239/209; 239/210; 239/263.1; 239/266; 416/146 R

(58) Field of Classification Search ............ 239/289, 239/209, 210, 263.1, 266, 17, 77, 200, 207, 239/208, 214, 214.15, 225.1, 264, 267, 283, 239/548, 575, 600; 416/146 R; 392/364
See application file for complete search history.

(56) References Cited

U.S. PATENT DOCUMENTS

| | | | |
|---|---|---|---|
| 5,507,619 A | 4/1996 | Ryan | |
| 5,524,450 A | 6/1996 | Chen | |
| 5,823,617 A | 10/1998 | Schafer | |
| 5,934,349 A | 8/1999 | Faller | |
| 5,979,793 A * | 11/1999 | Louis | 239/128 |
| 6,017,188 A * | 1/2000 | Benton | 416/5 |
| 6,086,053 A * | 7/2000 | Natschke et al. | 261/30 |
| 6,257,501 B1 | 7/2001 | Roach et al. | |
| 6,257,502 B1 * | 7/2001 | Hanish et al. | 239/290 |
| 6,443,714 B1 | 9/2002 | Hollenbeck et al. | |
| 6,587,642 B1 | 7/2003 | King | |
| 6,682,000 B1 | 1/2004 | Apple | |
| 6,786,701 B1 | 9/2004 | Huang et al. | |
| 6,945,868 B2 | 9/2005 | Gautney | |
| 7,070,123 B2 * | 7/2006 | Naedler | 239/251 |
| 2005/0006497 A1 * | 1/2005 | Polak | 239/289 |

* cited by examiner

Primary Examiner—Darren W Gorman
(74) Attorney, Agent, or Firm—Robert C. Montgomery

(57) ABSTRACT

A method and system for a ceiling fan with an integral water mister apparatus, particularly for outdoor use, includes a conventional ceiling fan having a multi-speed motor, forward and reverse directional capabilities and a plurality of rotating blades in a variety of diameter sizes. A series of water dispensing ports are directly above the blades toward the outer perimeter that selectably dispense a fine water mist. The mist is obtained by connecting ⅜" tubing to an available standard water supply and having said tubing conduct the water through a six by two inch, five micron, polyphosphate filter. The filtered water then travels through the tubing attached to the apparatus to the misting dispensing nozzles. The fine mist will evaporate quickly in hot weather producing a cooling effect without significantly wetting surrounding objects. The air circulation provided by the fan blades enhances the distribution of the mist and the cooling effect.

6 Claims, 3 Drawing Sheets

CEILING PADDLE FAN WITH INTEGRAL WATER MISTER AND ASSOCIATED METHOD

RELATED APPLICATIONS

The present invention was first described in and claims the benefit of U.S. Provisional Application No. 60/791,379, filed Apr. 13, 2006, the entire disclosures of which are incorporated herein by reference.

FIELD OF THE INVENTION

The present invention relates generally to a unique system and method for a ceiling paddle fan and, more particularly, to ceiling fan apparatus having an integral water misting attachment to provide localized evaporative cooling.

BACKGROUND OF THE INVENTION

Evaporative cooling systems utilize the cooling effect of evaporation to condition air inside homes, offices and businesses, as well as under awnings and roofs outdoors. Such systems function by drawing warm, dry air through a water laden pad. Such systems are generally very energy efficient, but since their cooling power is derived from the evaporating process, the water laden air must be generated and applied near the occupants to be cooled. This results in fans, filters, air handling units and the like being located near the occupants which can be noisy or other wise undesired. Also, such systems are difficult to add in on a retrofit basis. Accordingly, the need has been identified for an easy, alternate way of providing evaporative cooling in a localized area.

Several attempts have been made in the past to provide water-misting apparatuses. U.S. Pat. No. 6,257,501 in the name of Roach, et al. discloses a mister and an electric fan combination that is mounted upon a vertical stand. The mister has a housing arranged to define a curvature that is concentric with a rotational center of rotary fan blades and with the central back of the fan. The housing is attached to the fan guard grill. The mister has a flexible hose extending from a junction with the housing to a location distal from the housing to convey pressurized fluid from a source. The electric fan is pivotally connected on diametrically opposite sides to a connection structure, which is raised by a pole from a base structure.

U.S. Pat. No. 6,587,642 in the name of King discloses a ceiling fan cooling system comprising an A/C condenser unit, preferably mounted above/beyond the ceiling of a room, and an associated evaporator unit which is mounted in a housing on the inside of the ceiling or flush with the ceiling of the room. The evaporator unit draws room air in and blows it downwardly, over the evaporator coils, toward the blades of a conventional ceiling fan. The air is thus cooled by the evaporator coils and circulated throughout the room by the ceiling fan. The lower surface of the evaporator housing is configured to receive the mounting plate of a conventional off-the-shelf ceiling fan. The system may also be configured as a heating system, for example, using a heat pump or electrical heating elements incorporated into the evaporator housing, allowing the fan to blow air over them.

U.S. Pat. No. 6,945,868 in the name of Gautney describes a camouflaged outdoor fan system including a housing, a fan inserted into the housing, and a camouflaged lid removably connected to the housing. The housing is buried in the ground, or in alternative embodiment, mounted to the underside of a deck, the fan is inserted into the housing, and the camouflaged lid is placed over the fan to hide the fan and housing from view. The fan is operable to generate and propel an air stream out of the housing that can be used for cooling purposes. The system also may include optional features, such as a water-misting device, a heater, motion detectors, an evaporative cooling assembly, a temperature switch, a humidity switch, a rain gauge switch, a wind sensor switch, a dc power source, solar cells, or a remote control system.

None of the prior art particularly describes an easy, alternate way of providing evaporative cooling in a localized area. Accordingly, there is a need for an evaporative cooling system that utilizes the cooling effect of evaporation to condition air inside homes, offices and businesses, as well as under awnings and roofs outdoors.

SUMMARY OF THE INVENTION

In view of the foregoing disadvantages inherent in the prior art, it has been observed that there is need for easy, alternate way of providing evaporative cooling in a localized area.

The new and novel apparatus performing evaporative cooling is a ceiling paddle fan with an attached water mister. Although resembling a conventional ceiling fan commonly found in both the home and commercial establishments, the invention has in addition to the rotating blades, a series of dispensing ports for water misting occupants below. The mist is obtained by connecting to a standard water line or faucet with tubing routed through a five micron polyphosphate filter. From the filter the water is routed by additional tubing to the mist dispensing port nozzles. The water is regulated so that a fine mist evaporates in hot weather providing the cooling effect and before the surrounding objects become wet. The air movement of the fan blades aids in distributing the mist throughout a local area. It is envisioned that the invention would be available as either a factory option on new ceiling fans, or as a retrofit option kit for existing ceiling fans. The use of the innovative apparatus and method provides users with an effective means for cooling both indoor and shaded outdoor areas using the evaporative cooling process.

In particular, a water-misting apparatus for providing user comfort in outdoor environments includes a ceiling fan system including a plurality of fan blades operably coupled thereto, a mister system removably coupled to the ceiling fan system, and a water supply system in fluid communication with the mister system such a plurality of independent streams of water are discharged along a circumferential path when the ceiling fan system is operably rotated.

A water-misting apparatus for providing user comfort in outdoor environments preferably includes a ceiling fan system including a plurality of fan blades operably coupled thereto, a mister system removably coupled to the ceiling fan system, and a water supply system in fluid communication with the mister system such a plurality of independent streams of water are discharged along a circumferential path when the ceiling fan system is operably rotated. Advantageously, the ceiling fan system and the mister system are simultaneously and independently operable.

In a preferred embodiment, the ceiling fan system preferably includes a power operated fan motor shroud supporting the mister system above a ground surface, a support shaft connected to the fan motor shroud and a mounting bracket connected to the support shaft. Advantageously, the fan blades are coupled to the fan motor shroud in such a manner that the fan blades rotate about an axis perpendicular to the fan motor shroud and in clockwise and counter-clockwise directions based upon a user input. In a preferred embodiment, each of the fan blades includes a base member and an extended member mated to the base member. The extended member is angled from the base member to thereby create a paddle shape and further has a curvilinear edge formed at a distal tip thereof respectively.

In a preferred embodiment, the mister system includes a plurality of mister arms located along the fan blades and equidistantly spaced apart from a center of the fan motor shroud. Such mister arms define a curvature travel path that is concentric with a rotational center of the fan motor shroud when the ceiling fan system is operating. Each of the mister arms is provided with a nozzle connected to a distal end thereof wherein the nozzles have an orifice formed therein for scattering the water outwardly from the mister arms respectively. The mister system further includes a mister manifold assembly in fluid communication with the mister arms respectively such that the water is guided about the circumference of the fan motor shroud and subsequently discharged through each of the mister arms respectively. The mister manifold assembly further includes a plurality of fittings mating a proximal end of the mister arms to selected portions the mister manifold assembly.

In a preferred embodiment, the water supply system includes a pump assembly including a flexible water supply tube in fluid communication with an external water supply source for channeling water to the pump assembly. Such a pump assembly further includes a pressure relief valve operably coupled to the pump assembly to reduce dripping when the apparatus is toggled to an inoperable mode. A filter is located up stream of the pressure relief valve for removing undesirable particulates from the water and a pump switch is electrically coupled to the pump assembly and an external power supply source for toggling the pump assembly between on and off positions respectively.

In an alternate embodiment, the mister manifold assembly may include a plurality of clips removably attached thereto such that the mister manifold assembly is removably attached to the fan motor shroud.

In operation, a method for installing and utilizing a water-misting apparatus includes the steps of: mounting a water pump assembly and an associated filter to a support surface; connecting an external water supply line to the water pump assembly and the filter respectively; mounting a pump switch to a convenient wall surface for controlling the water pump assembly; wiring the pump switch to an existing 110-volt circuit; mounting a ceiling fan system to a desired ceiling area, the ceiling fan system has a fan motor shroud suspended below the ceiling area; affixing a water supply tube from the water pump assembly and the filter to a support shaft of the ceiling fan system; attaching at least one mister system to a fan motor shroud of the ceiling fan system; checking an integrity of all plumbing and electrical connections; activating the ceiling fan system; switching the pump switch to an on position to initiate the propagation of evaporative mist; and switching the pump switch to an off position to optionally operate the ceiling fan system while the at least one mister system is inoperable.

In an alternate embodiment, such a method may further include the step of attaching a water control valve to the water pump assembly so that a user may manually control the volume of water flowing into the at least one mister system.

In yet another embodiment, the user may affix a first one of the at least one mister systems to an under surface of the fan motor shroud and further affix another one of the mister systems to an upper surface of the fan motor shroud.

In yet another embodiment, the user may removably attach a water discharge nozzle to one or both of the mister systems for aerating the water during operating conditions.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
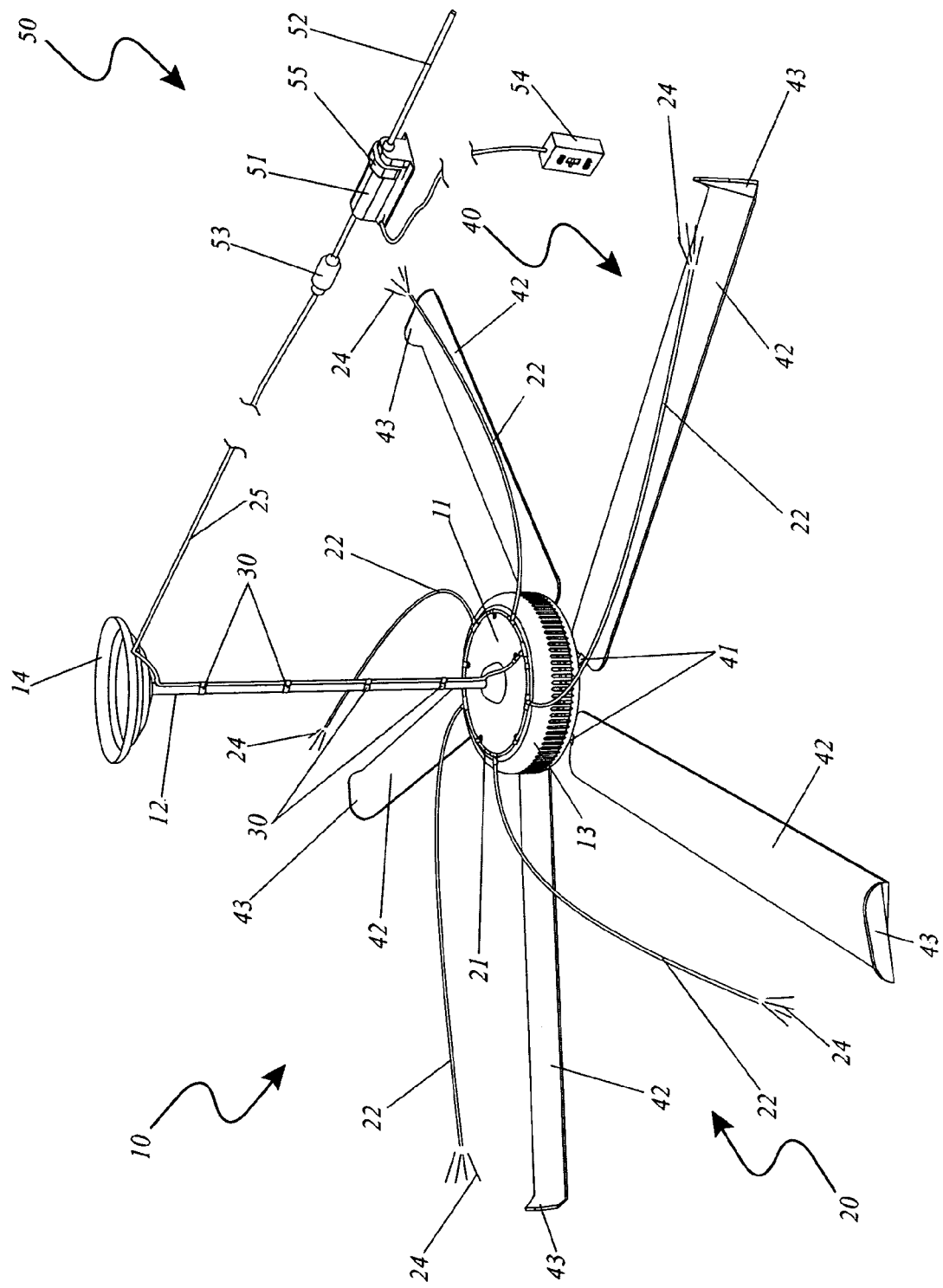
FIG. 1 is a perspective view of a ceiling fan mister 10, according to a preferred embodiment of the present invention.

DESCRIPTIVE KEY 10 ceiling fan mister
11 fan motor shroud
12 support shaft
13 rotating member
14 mounting bracket
20 mister system
21 mister manifold assembly
22 mister arm assembly
23 nozzle
24 mist
25 water supply tube
26 orifice
27 mister arm tube
28 elbow
29 tubing clip
30 tie-wrap
31 mister manifold tubing
40 ceiling fan blade
41 base member
42 extended member
43 curvilinear edge
50 water supply system
51 pump assembly
52 water supply line
53 filter
54 pump switch
55 relief valve

DETAILED DESCRIPTION OF THE PREFERRED EMBODIMENT

Figure 2:
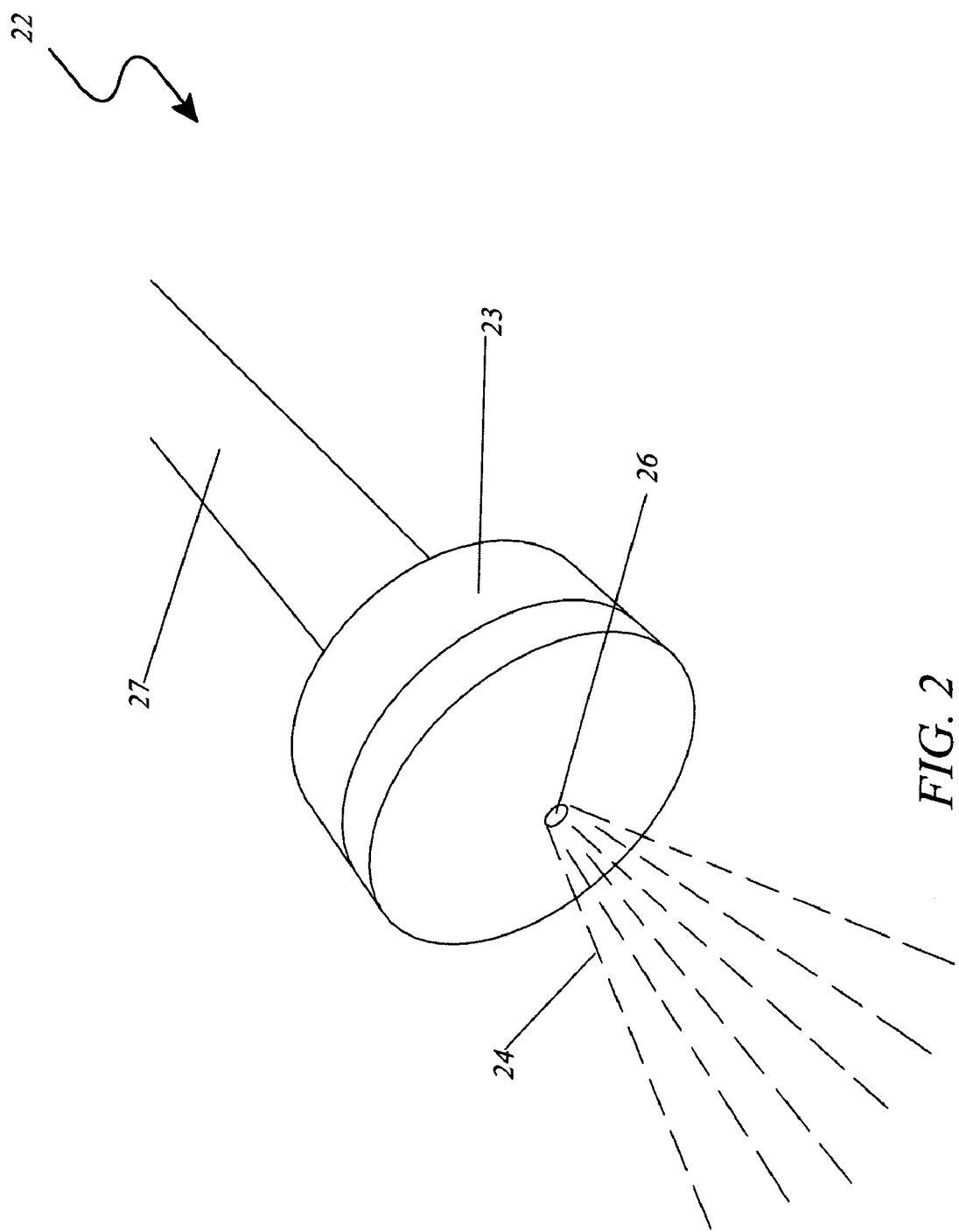
FIG. 2 is a close-up view of a mister arm assembly 22 portion of a ceiling fan mister 10, according to a preferred embodiment of the present invention; and, FIG. 3 is a close-up view of a mister manifold assembly portion 21 of a ceiling fan mister 10, according to a preferred embodiment of the present invention.
Figure 3:
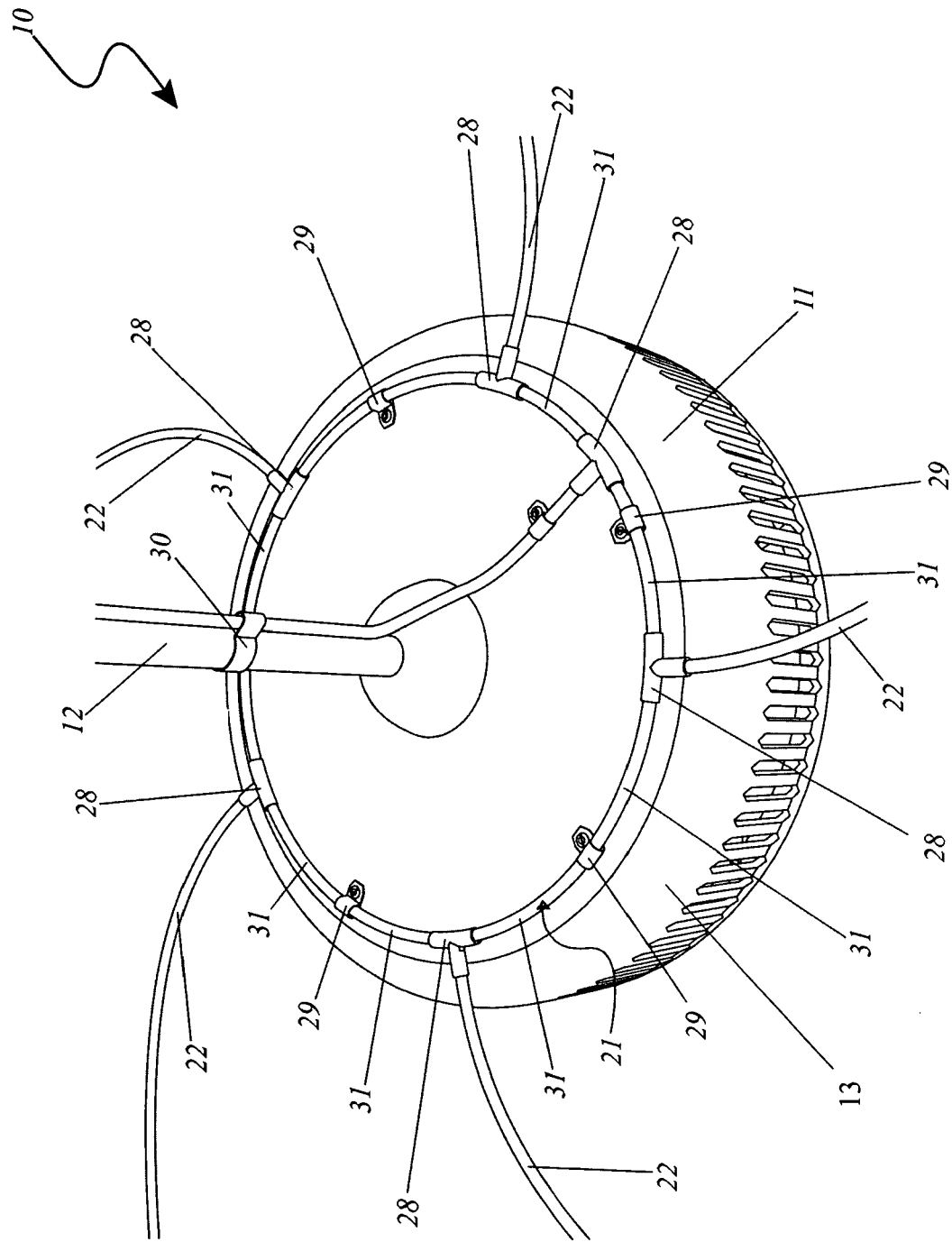

The best mode for carrying out the invention is presented in terms of its preferred embodiment, herein depicted within FIGS. 1 through 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a ceiling fan mister (herein described as the "apparatus")

10, which provides a means for a novel ceiling fan with an integral water mister apparatus 20, particularly for outdoor use. The apparatus 10 comprises a conventional ceiling fan system with particular enhancements such as a plurality of rotating blades 40 in a variety of diameters and sizes and a series of water dispensing arms 22 to dispense a fine water mist 24. The apparatus 10 further comprises a water supply system 50 providing a high pressure filtered water supply to said arms 22. The air circulation provided by the fan blades 40 enhances the distribution and evaporation of the mist 24, thereby producing an enjoyable cooling effect.

Referring now to FIG. 1, a perspective view of the apparatus 10, according to the preferred embodiment of the present invention, is disclosed. The apparatus 10 instigates an adequate breeze velocity to convey cooling commencing from the evaporation process of mist 24 produced therefrom the mister system 20 and dispensed over a wide span utilizing a ceiling fan blade system 40. The apparatus 10 may be fabricated using materials such as plastic, metal, or the like suitable to withstand the heat and moisture of the outdoors. The apparatus 10 comprises a ceiling fan system, a plurality of fan blades 40, a mister system 20, and a water supply system 50.

The ceiling fan system is envisioned to be similar to conventional electric ceiling fan systems providing features such as, but not limited to, multi-speed selection, reversible direction, lighting, remote controls, decorative enclosures, and the like, and as such should not be interpreted as a limiting factor of the present invention 10. The apparatus 10 as illustrated here comprises a fan motor shroud 11, a support shaft 12, a mounting bracket 14, a rotating member 13, and a plurality of fan blades 40. The motor shroud 11 provides a motor housing and a moisture sealing means, thereby providing protection of the apparatus 10 from excessive moisture.

The fan motor shroud 11 is attached to a ceiling in a suspended manner by a connection structure comprising a support shaft 12 and a ceiling mounting bracket 14. The fan motor shroud 11 further provides an attachment means along a top surface to the mister system 20. The rotating member 13 may be of any shape appropriate for attaching fan blades 40, although a circular shape is envisioned. The rotating member 13 is driven by an electric motor located within the fan motor shroud 11 and moves independently thereof. The fan blades 40 are envisioned to be utilized comprising of a variety of designs and methods of integration rotating about an axis perpendicular to the fan motor shroud 11 in a clockwise or counter-clockwise course, manually or automatically selected, generating outward air currents. Optional ceiling fan features such as integral lighting, differential motor speed options, and manual fan speed selection may be provided based on user preference.

Each fan blade 40 is preferably, but not essentially, to comprise of a base member 41 and an extended member 42. The extended members 42 are angled therefrom said base members 41 creating a paddle like effect, as depicted in FIG. 1, to generate a more optimum outward breeze thereby allowing more time for evaporation and producing a broadened cooling propagation. The extended members 42 further incorporate a curvilinear edge 43 to produce a broadened air circulation. Although the invention 10 is depicted in the preferred embodiment, the fan blades 40 may be provided in various shapes, colors, and patterns and as such should not be interpreted as a limiting factor of the present invention 10.

The mister system 20 further comprises a plurality of mister arm assemblies 22, a mister manifold assembly 21, and a water supply tube 25. The mister arm assemblies 22 are located directly above the fan blades 40 providing maximum distance from the ground thereby producing superior misting propagation, with a central back of the fan and arranged to define a curvature that is concentric with a rotational center. A plurality of mister arm assemblies 22 extend therefrom the mister manifold assembly 21 for optimum moisture propagation and, consequently, a better evaporative cooling range. The mister arm assemblies 22 are envisioned to be equally spaced apart and curvilinear in a plurality of contours for function and design. Therefore, by affixing the mister arm assemblies 22 at points equidistantly spaced away from the center hub of the ceiling fan, the apparatus 10 provides a way of increasing the distance between mister arm assemblies 22 without subsequently blocking the passage of air currents created by the fan blades 40. The mister manifold assembly 21 is attached to and provided pressurized water via a water supply system 50.

The water supply system 50 further comprises a pump assembly 51, a pump switch 54, and a filter 53. The water supply system 50 is illustrated here being located at a remote location from the mister system 20; however, may be provided in a variety of configurations such as attached to the ceiling above the apparatus 10, integral to the fan motor shroud 11, or the like and as such should not be interpreted as a limiting factor of the present invention 10. It is envisioned that the user attach a normal potable household water supply line 52 to the apparatus 10 being connected thereto a high pressure pump assembly 51.

The water supply line 52 is envisioned to comprise standard upstream plumbing components to control water flow and pressure. The pump assembly 51 provides a high-pressure flow means to the apparatus 10 to aid in effectively atomizing the water, thereby creating the mist 24. The pump assembly 51 further comprises a maximum pressure rating of approximately 80 to 100 PSI. The pump assembly 51 comprises a commercially available miniature rotary impeller pump with an integral 110-volt motor and pressure relief valve 55 to reduce dripping when the apparatus 10 is turned off. The pump assembly 51 receives AC current via a wall mounted pump switch 54 which is connected to an existing 110-volt household circuit. The pump assembly 51 provides a pressurized water flow through a filter 53. The filter 53 is envisioned to provide a filtering capability of approximately 5 microns, thereby providing removal of particulate matter which could possibly clog the mister arm portion 22 of the apparatus 10. Connected to the filter 53 is a water supply tube 25 which provides transportation means for said filtered water thereto the mister system 20. The said water supply tube 25 is attached to the support shaft 12 along a vertical and external location via a plurality of tie-wraps 30.

Referring now to FIG. 2, a close-up view of a mister arm assembly 22 portion of apparatus 10, according to the preferred embodiment of the present invention, is disclosed. The mister arm assembly 22 comprises a mister manifold assembly 21, a "T"-fitting 28, a mister arm tube 27, a nozzle 23, and an orifice 26. The mister system 20 preferably comprises a hollow tube-like structure permitting a channeling passage through which water may travel. The misting arm tube 27 provides an attachment with a concentric mister manifold assembly 21 via a "T"-fitting 28. It is envisioned that the mister arm tube 27 comprises a smaller diameter than that of the concentric mister manifold assembly 21. The mister arm tube 27 is envisioned to be gently curved; however, may be provided in a variety of attractive designs. Located at the terminal end of said mister arm tube 27 is a nozzle 23.

The nozzle 23 provides an atomizing means to the aforementioned water supply via an atomizing orifice design 26 to produce a cooling mist 24. The atomizing nozzle 23 is envisioned to be a commercially available screw-on atomizer device made of materials such as stainless steel, brass, or the like common in the industry. The mister arm assembly 22 is illustrated here depicting a mister arm tube 27 comprising a single nozzle 23 configuration; however each mister arm assembly 22 may be provided with various nozzle 23 configurations such as multiple nozzles 23, nozzles 23 containing multiple orifices 26, or the like, to increase the volume of generated mist 24 resulting in an increased cooling effect of the apparatus 10 and as such should not be interpreted as a limiting factor of the present invention 10.

Referring now to FIG. 3, a close-up view of a mister manifold assembly portion 21 of the apparatus 10, according to the preferred embodiment of the present invention, is disclosed. The mister manifold assembly 21 is removably attached thereto the fan motor shroud 11 using tubing clips 29 having a configuration of a series of mister manifold tubing sections 31 attached by a plurality of "T"-fittings 28, thereby forming a complete circular ring being concentric with a rotational center of the fan motor shroud 11 with a plurality of mister arm assemblies 22 extending therefrom for optimum moisture propagation. The mister manifold assembly 21 may also be fabricated out of flexible hose, or, more preferably, a metallic tubular construction using materials such as stainless steel, brass, copper, or the like. The propagation area of the mist cloud 24 produced may be decreased or increased by decreasing or increasing the diameter of the concentric mister manifold assembly 21. The mister manifold assembly 21 provides an attachment means to the aforementioned water supply tube 25 via a "T"-fitting 28 located along said mister manifold assembly 21.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user with little or no special skills and minimum experience or training, if necessary, an experienced electrical and plumber should be consulted in the installation process. After initial purchase or acquisition of the apparatus 10, it would be installed as indicated in FIG. 1.

The method of installing and utilizing the apparatus 10 may be achieved by performing the following steps: mounting the pump assembly 51 and filter 53 in a convenient location (if required); connecting an available household water line 52, comprising standard upstream flow and pressure controls, to the appropriate plumbing fitting located upon the pump assembly 51; mounting the pump switch 54 upon a convenient wall surface; wiring said switch 54 to an available 110-volt circuit; mounting the ceiling fan portion of the apparatus 10 to a desired ceiling area using similar tools, techniques, and fasteners required to install most conventional ceiling fans using the support shaft 12 and the ceiling mounting bracket 14; affixing the water supply tube 25 to said support shaft 12 using the tie-wraps 30 (if required); routing and securing the water supply tube 25 along a ceiling surface thereto the location of the water supply system 50; trimming and connecting the water supply tube 25 to the appropriate plumbing fitting at the filter 53; checking the integrity of all plumbing and electrical connections; activating the ceiling fan system and switching the pump switch 54 to the ON position to initiate the propagation of evaporative mist 24; switching said pump switch 54 to the OFF position to optionally operate the ceiling fan system in a normal manner; and, enjoying the comfort and cooling effect of the evaporative mist 24 propagating from the apparatus 10 in a convenient and attractive manner.

An alternate embodiment of the present apparatus 10 may include an attachment means for the mister system 20 to be affixed thereto the apparatus 10 below the rotary fan blades 40 instead of or in conjunction with a mister system 20 affixed thereto the apparatus 10 above the rotary fan blades 40. A mister system 20 affixed thereto below the rotary fan blades 40 may prevent mist 24 from descending onto the blades 40 and collecting condensation.

Another alternate embodiment of the present apparatus 10 may include a connection means thereto a variety of water supply configurations such as a waterline for industrial use, a reservoir with pump or reducing nozzle, and the like. A regulation valve may also be utilized to regulate the amount of water flowing therethrough the mister system 20 thereby producing a density of the mist cloud 24 adequate for the desired process. Therefore, the supply tube 25 may have a valve so that a user may manually control the volume of water flowing into the mister system 20 at any time.

Yet another alternate embodiment of the present apparatus 10 may be to procure said apparatus 10 as the preferred embodiment but without the ceiling fan system portion, therefore being attached to an existing ceiling fan system. Additionally, the apparatus 10 may be introduced with custom designed fan blades 40 for replacement of existing fan blades 40.

Still yet another embodiment of the present apparatus 10 provides the use of various nozzle 23 configurations such as simple orifices with an aerating screen at the opening of the water path as it leaves the mister arm assembly 22, aerator nozzles 23 capable of charging the water with air or a gas, a plurality of nozzles 23 may alternately be positioned along the length of the bottom portion of the mister arm 22 instead of at the end of said mister arm 22.

Still yet another embodiment of the present apparatus 10 provides consolidation of the pump switch function 54 and all ceiling fan functions into a single remote control system.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A water-misting apparatus for providing user comfort in outdoor environments comprises:
    a ceiling fan system including a plurality of fan blades operably coupled thereto, further comprising:
        a power operated fan motor shroud supporting said mister system above a ground surface;
        a support shaft connected to said fan motor shroud;
        a mounting bracket connected to said support shaft; and,
        said fan blades each comprises a base member and an extended member mated to said base member, said extended member being angled from said base member to thereby create a paddle shape, said extended member having a curvilinear edge formed at a distal tip thereof respectively;

wherein said fan blades are coupled to said fan motor shroud in such a manner that said fan blades rotate about an axis perpendicular to said fan motor shroud and in clockwise and counter-clockwise directions based upon a user input;

a mister system removably coupled to said ceiling fan system, further comprising:

a plurality of mister arms located along said fan blades and equidistantly spaced apart from a center of said fan motor shroud, said mister arms defining a curvature travel path that is concentric with a rotational center of said fan motor shroud when said ceiling fan system is operating, each of said mister arms being provided with a nozzle connected to a distal end thereof wherein said nozzles have an orifice formed therein for scattering the water outwardly from said mister arms respectively; and, a mister manifold assembly in fluid communication with said mister arms respectively such that the water is guided about the circumference of said fan motor shroud and subsequently discharged through each of said mister arms respectively, said mister manifold assembly including a plurality of fittings mating a proximal end of said mister arms to selected portions said mister manifold assembly; and, a water supply system in fluid communication with said mister system such that a plurality of independent streams of water are discharged along a circumferential path when said ceiling fan system is operably rotated.

2. The water-misting apparatus of claim 1, wherein said water supply system comprises:

a pump assembly including:

a flexible water supply tube in fluid communication with an external water supply source for channeling water to said pump assembly;

a pressure relief valve operably coupled to said pump assembly to reduce dripping when said apparatus is toggled to an inoperable mode;

a filter located up stream of said pressure relief valve for removing undesirable particulates from the water; and, a pump switch electrically coupled to said pump assembly and an external power supply source for toggling said pump assembly between on and off positions respectively.

3. The water-misting apparatus of claim 2, wherein said mister manifold assembly comprises: a plurality of clips removably attached thereto such that said mister manifold assembly is removably attached to said fan motor shroud.

4. A water-misting apparatus for providing user comfort in outdoor environments comprises:

a ceiling fan system including a plurality of fan blades operably coupled thereto, further comprising:

a power operated fan motor shroud supporting said mister system above a ground surface;

a support shaft connected to said fan motor shroud;

a mounting bracket connected to said support shaft; and, said fan blades each comprises a base member and an extended member mated to said base member, said extended member being angled from said base member to thereby create a paddle shape, said extended member having a curvilinear edge formed at a distal tip thereof respectively;

wherein said fan blades are coupled to said fan motor shroud in such a manner that said fan blades rotate about an axis perpendicular to said fan motor shroud and in clockwise and counter-clockwise directions based upon a user input;

a mister system removably coupled to said ceiling fan system, further comprising:

a plurality of mister arms located along said fan blades and equidistantly spaced apart from a center of said fan motor shroud, said mister arms defining a curvature travel path that is concentric with a rotational center of said fan motor shroud when said ceiling fan system is operating, each of said mister arms being provided with a nozzle connected to a distal end thereof wherein said nozzles have an orifice formed therein for scattering the water outwardly from said mister arms respectively; and, a mister manifold assembly in fluid communication with said mister arms respectively such that the water is guided about the circumference of said fan motor shroud and subsequently discharged through each of said mister arms respectively, said mister manifold assembly including a plurality of fittings mating a proximal end of said mister arms to selected portions said mister manifold assembly; and, a water supply system in fluid communication with said mister system such that a plurality of independent streams of water are discharged along a circumferential path when said ceiling fan system is operably rotated;

wherein said ceiling fan system and said mister system are simultaneously and independently operable.

5. The water-misting apparatus of claim 4, wherein said water supply system comprises:

a pump assembly including:

a flexible water supply tube in fluid communication with an external water supply source for channeling water to said pump assembly;

a pressure relief valve operably coupled to said pump assembly to reduce dripping when said apparatus is toggled to an inoperable mode;

a filter located up stream of said pressure relief valve for removing undesirable particulates from the water; and, a pump switch electrically coupled to said pump assembly and an external power supply source for toggling said pump assembly between on and off positions respectively.

6. The water-misting apparatus of claim 5, wherein said mister manifold assembly comprises: a plurality of clips removably attached thereto such that said mister manifold assembly is removably attached to said fan motor shroud.

* * * * *